United States Patent [19]

Hayashi et al.

[11] Patent Number: 5,165,331
[45] Date of Patent: Nov. 24, 1992

[54] AUTOMATIC VENDING MACHINE FOR NOODLES

[75] Inventors: Atsuo Hayashi, Gunma; Kazuhiko Takano, Kohnosu, both of Japan

[73] Assignee: Sanyo Electric Co., Ltd., Moriguchi, Japan

[21] Appl. No.: 797,756

[22] Filed: Nov. 25, 1991

[30] Foreign Application Priority Data

Nov. 26, 1990 [JP] Japan ................... 2-322209

[51] Int. Cl.⁵ ............... A23L 1/10; A21C 11/24
[52] U.S. Cl. .................... 99/450.2; 53/260; 53/555; 99/357; 99/450.1; 99/484; 99/494
[58] Field of Search ............. 99/352, 353, 355, 356, 99/357, 450.1, 450.2, 450.7, 484, 494; 53/553, 555, 260, 522, 122; 118/16, 24; 221/135, 199, 206

[56] References Cited

U.S. PATENT DOCUMENTS

| | | |
|---|---|---|
| 3,928,045 | 12/1975 | Tsunoda et al. ............ 221/150 HC |
| 3,937,848 | 2/1976 | Campbell et al. ............... 99/353 |
| 4,147,081 | 4/1979 | Pellaton ...................... 99/356 |
| 4,210,074 | 7/1980 | Laughman .................... 118/16 |
| 4,679,496 | 7/1987 | Simelunas et al. ............ 99/450.2 |
| 4,848,218 | 7/1989 | Battaglia ................... 99/450.2 |
| 4,919,950 | 4/1990 | Mak ........................... 99/357 |
| 4,945,712 | 8/1990 | Bennett ....................... 53/555 |
| 4,964,263 | 10/1990 | Ballestrazzi et al. .......... 53/555 |
| 4,974,824 | 12/1990 | Kimbel et al. ................ 53/553 |
| 5,010,806 | 4/1991 | Narcisi et al. ................ 99/352 |

FOREIGN PATENT DOCUMENTS

| | | | |
|---|---|---|---|
| 2640232 | 6/1990 | France ........................ 53/555 |
| 60-172264 | 9/1985 | Japan . | |
| 2-131534 | 5/1990 | Japan ........................ 99/450.1 |

Primary Examiner—Timothy F. Simone
Attorney, Agent, or Firm—Armstrong & Kubovcik

[57] ABSTRACT

An automatic vending machine for noodles, comprising: noodle-making means for forming grain flour into powered fish-like noodle materials, rolling said materials into a noodle web, and cutting said noodle web into noodle lines to make noodles; powder sprinkling means for sprinkling powder on the noodle lines prepared by said noodle-making means; packing means for packing the noodle lines having the powder sprinkled by said powder sprinkling means into a bag; and discharge means for discharging a bag body in which a noodle ball of the noodle lines is packed by said packing means to an outlet.

4 Claims, 12 Drawing Sheets

AUTOMATIC VENDING MACHINE FOR NOODLES

BACKGROUND OF THE INVENTION

1. Field of the Invention

The present invention relates to an automatic vending machine for noodles, for example, "wheat vermicelli" or "buckwheat vermicelli".

2. Description of the Prior Art

Recently, in convenience stores or food stores, a few kinds of raw noodles such as "wheat vermicelli" or "buckwheat vermicelli" are displayed and sold.

However, the raw noodles as described are normally produced in volume in a noodle-making factory, and then transported to stores or the like at which the noodles are sold. It takes at least a few days from the production of the noodles to the appreciation thereof by customers.

Therefore it is necessary to add various preservatives to noodles produced in the noodle-making factory and to simultaneously mange storage temperatures and appreciation periods thereof.

In the past, an automatic noodle-making apparatus as disclosed, for example, in Japanese Patent Unexamined Publication (Kokai) No. 60-172264 (International Class:A23L1/16) has been developed and put into practical use.

In the noodle-making apparatus of this kind, grain flour is stirred and mixed together with kneading water as a mixture to knead them and produce powdered fish-like noodle materials. The noodle materials are rolled by a rolling roller to form a noodle web. The noodle web is cut by a cutting roll to form noodle lines or strips.

However, the aforementioned conventional noodle-making apparatus is installed in a kitchen of a store and used to cook the prepared noodles for sales. The apparatus is merely aimed at labor-saving in the kitchen.

Further, it is necessary for wrapping long noodle lines with a wrapping film to fold the noodle lines. However, this poses a problem in that when a part of the folded noodle lines is forced out of a sealing portion of the film, it is difficult to heat-seal the films.

Moreover, in the case where the noodle lines prepared by the conventional noodle-making apparatus are immediately cooked, no problem occurs. However, in the case where the noodles lines are stored for reason of work or for the aging of noodles, it is necessary to prevent the noodle lines from being stuck to each other by sprinkling powder on the prepared noodle lines.

Furthermore, as the powdering device incorporated in the conventional noodle-making apparatus, a device is known in which a rotating brush is used to drop powder from holes. However, in this case, it is difficult to clean the brush. The device is unsanitary and complicated in construction. The device is not only costly but tends to be worn. The device is further poor in durability.

SUMMARY OF THE INVENTION

An object of the present invention is to provide an automatic vending machine for noodles which can sell raw noddles by an unattended system.

It is a further object of the present invention to provide an automatic vending machine for noodles which can easily wrap noodle lines.

It is another object of the present invention to provide an automatic vending machine for noodles which renders a construction of powder sprinkling means simple.

For achieving the aforesaid objects, the automatic vending machine according to the present invention comprises noodle making means for forming grain flour into powdered fish-like noodle materials, rolling said materials into a noodle web and cutting said noodle web into noodle lines; powder sprinkling means for sprinkling powder on the noodle lines prepared by said noodle-making means; packing means for packing the noodles lines that have been sprinkled with powder by said powder sprinkling means into a bag; and discharge means for discharging a bag in which a noodle ball of the noodle lines is packed by said packing means toward an outlet.

Further, for achieving the aforesaid objects, the present invention provides an automatic vending machine for noodles comprising means for packing noodle lines that have been prepared by noodle-making means to discharge the noodle lines toward an outlet, said packing means comprising noodle-line insert means for moving the noodle lines to form a noodle ball and insert it between films, and deposition means for depositing and cutting a seal portion between films around the noodle ball and pressed by said press means.

In this case, preferably the sealing portion between films around the noodle ball that are pressed by said press means is supported by a cushion member.

Moreover, for achieving the aforesaid objects, the present invention provides an automatic vending machine for noodles comprising means for sprinkling powder on noodle lines prepared by noodle-making means and packing said noodle lines by packing means to discharge the noodle lines toward an outlet, said powder sprinkling means comprising a hopper portion in which powder is received, an opening and closing plate provided slidably and closably in a bottom opening of said hopper portion and having a number of powder drop ports, and a powder discharge mechanism provided on the upper surface of said opening and closing plate; said powder discharge mechanism comprising a rotatable rotational shaft, a pair of rotational disks provided on opposite ends of said rotational shaft, a plurality of stirring shafts provided in a circumferential direction on the outer periphery of said rotational disks and bridged in a free oscillating state between support shaft grooves provided on the outer periphery, and guides provided on the bottom side of said hopper portion so as to be positioned at the lower portion of the outer periphery of said rotational disks to guide said stirring shafts so that the latter are rolled on the upper surface of the opening and closing plate constituting the inner bottom surface of the hopper portion.

According to the present invention, powder is sprinkled on the noodle lines prepared by the noodle-making means, and the noodle lines with the powder sprinkled thereon are packed into a bag, which is discharged toward the outlet. Therefore, fresh raw noodles are automatically sold, and unattended automatic sales can be made.

Further, the packing means moves the noodle lines to form a noodle ball and insert it films, to press between the films around the noodle lines and to deposit and cut the sealing portion between the films around the pressed noodle ball. Therefore, a roll-shape film is used to effect continuous packing. In addition, a complicated cutter mechanism as in the prior art is not necessary.

Moreover, the sealing portion between the films around the noodle lines pressed by the press means is supported by the cushion member. Therefore, even if a part of the noodle lines is forced out of the sealing portion between the films, the forced out part of the noodle lines is embedded into the cushion member by the pressing force whereby contact between the films except the forced out part of the noodle lines is enhanced so that the deposition between the films can be easily carried out.

Further, the aforesaid powder sprinkling means comprises an opening and closing plate provided slidably and closably in a bottom opening of the hopper portion and having a number of powder drop ports. On the upper surface of the opening and closing plate is provided a powder discharge mechanism comprising a rotatable rotational shaft, a pair of rotational disks provided on opposite ends of said rotational shaft, a plurality of stirring shafts provided in a circumferential direction on the outer periphery of said rotational disks and bridged in a free oscillating state between support shaft grooves provided on the outer periphery, and guides provided on the bottom side of said hopper portion so as to be positioned at the lower portion of the outer periphery of said rotational disks to guide said stirring shafts so that the latter are rolled on the upper surface of the opening and closing plate constituting the inner bottom surface of the hopper portion. Therefore, the rotational disks are rotated whereby the stirring shafts are guided so that the latter are rolled on the upper surface of the opening and closing plate constituting the inner bottom surface of the hopper portion. Powder accumulated on the upper surface of the opening and closing plate is compressed by the weight of the stirring shafts and smoothly discharged out of the powder drop ports of the opening and closing plate.

When the opening and closing plate is removed, the bottom opening of the hopper portion is opened to enable the discharge of the powder within the hopper portion. In addition, the stirring shafts can be easily removed so that the stirring shafts are easily washed and cleaned, which is sanitary.

Furthermore, the number of the stirring shafts can be increased or decreased whereby the falling amount (sprinkling amount) of powder is easily adjusted.

DETAILED DESCRIPTION OF THE PREFERRED EMBODIMENTS

Figure 1:
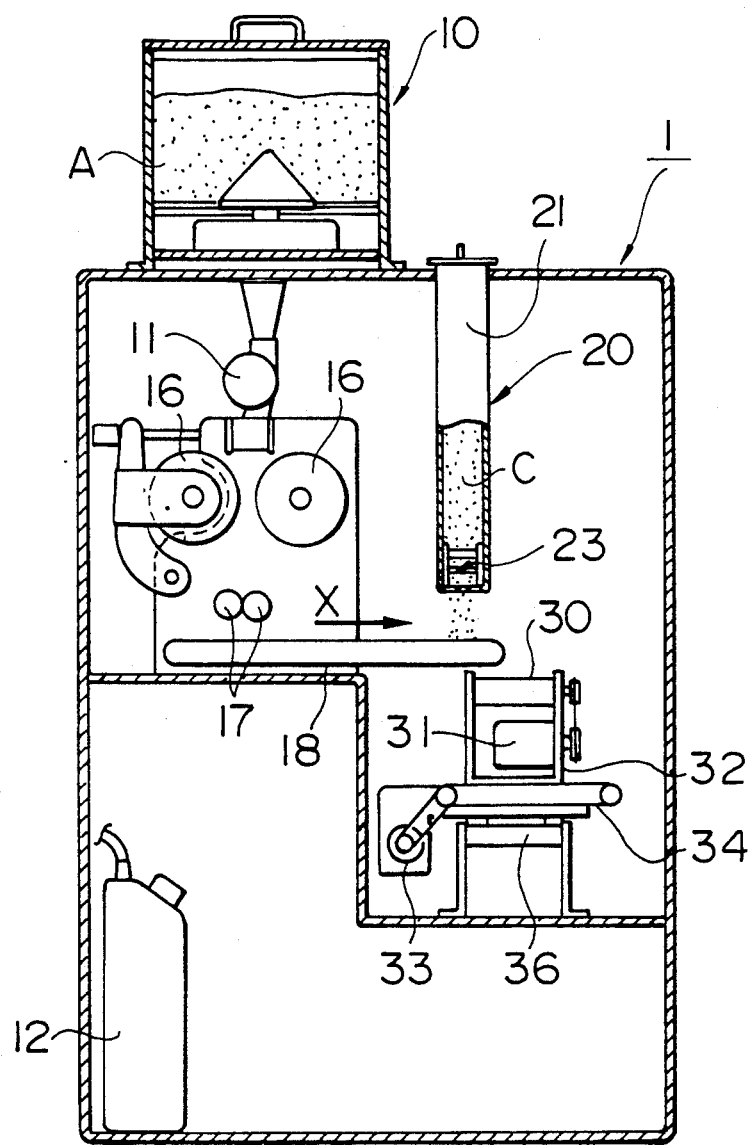
FIG. 1 is a longitudinal sectional side view as viewed from the back schematically showing one embodiment of an automatic vending machine for noodles according to the present invention.

The present invention will be described in detail while referring to one embodiment shown in the drawings.

Figure 2:
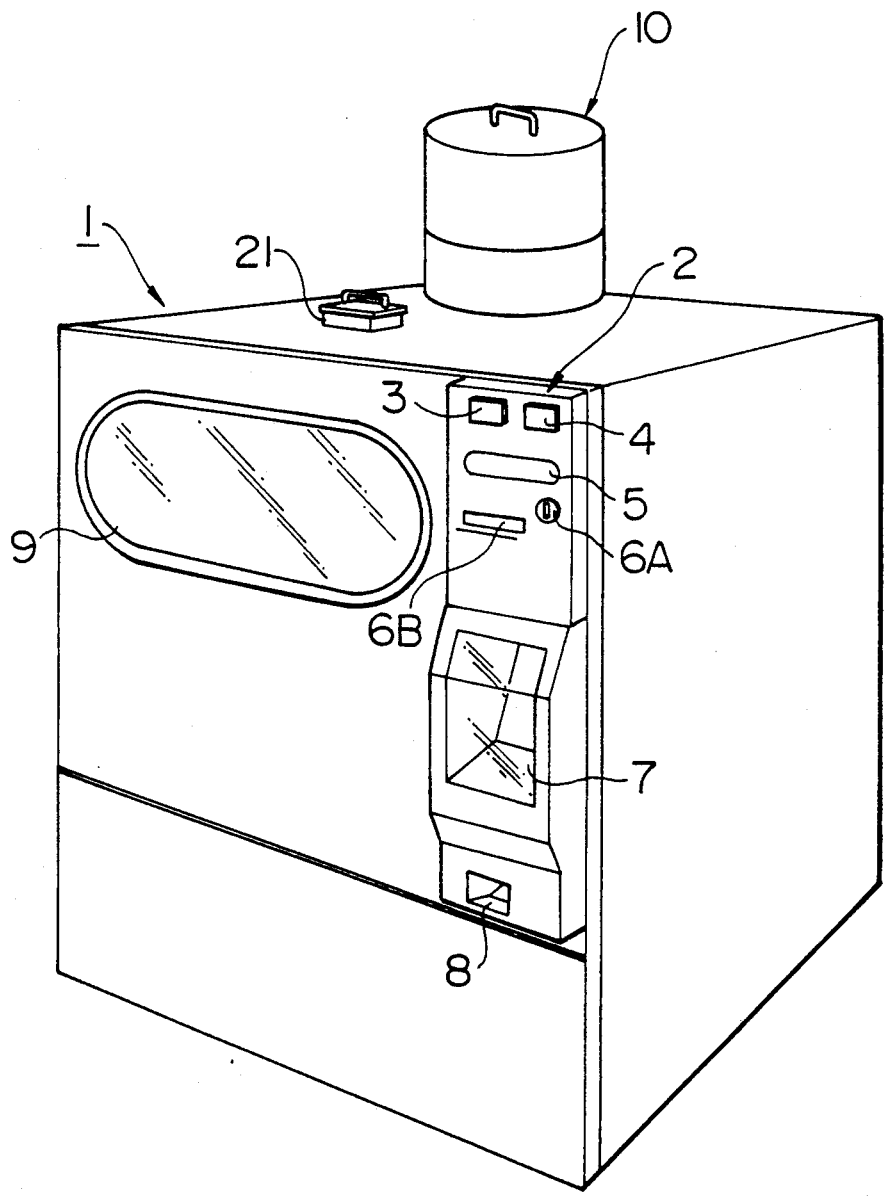
FIG. 2 is an external view of the automatic vending machine.
Figure 3:
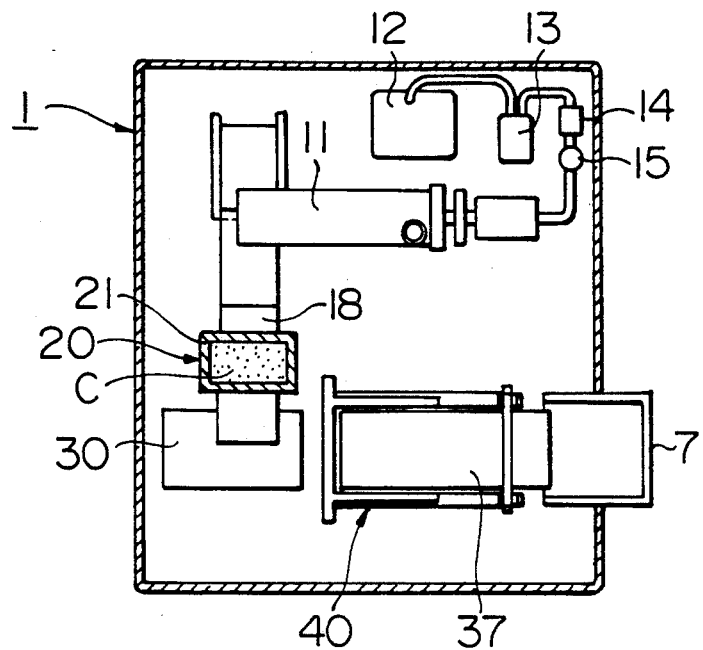
FIG. 3 is a cross-sectional plan view of the same.
Figure 4:
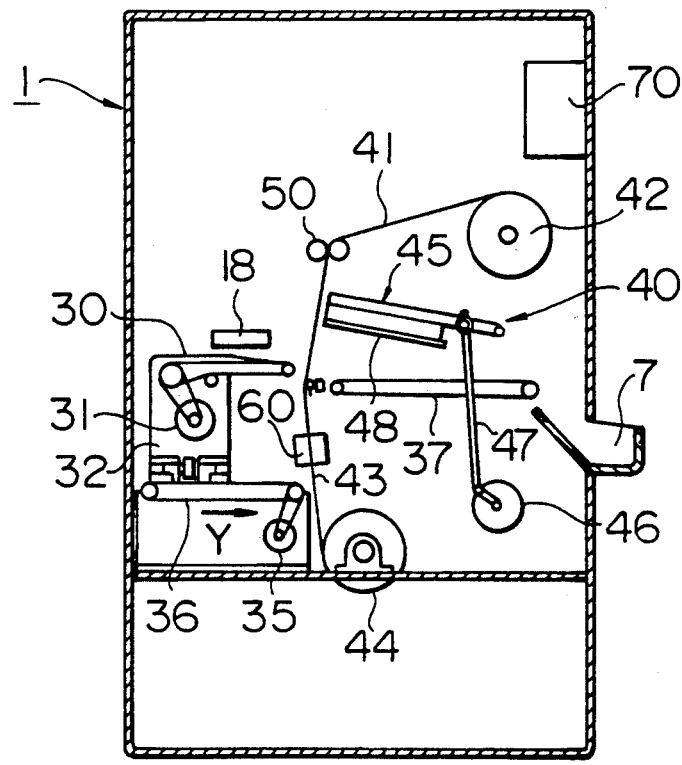
FIG. 4 is longitudinal sectional side view as viewed from the left side of the same.
Figure 5:
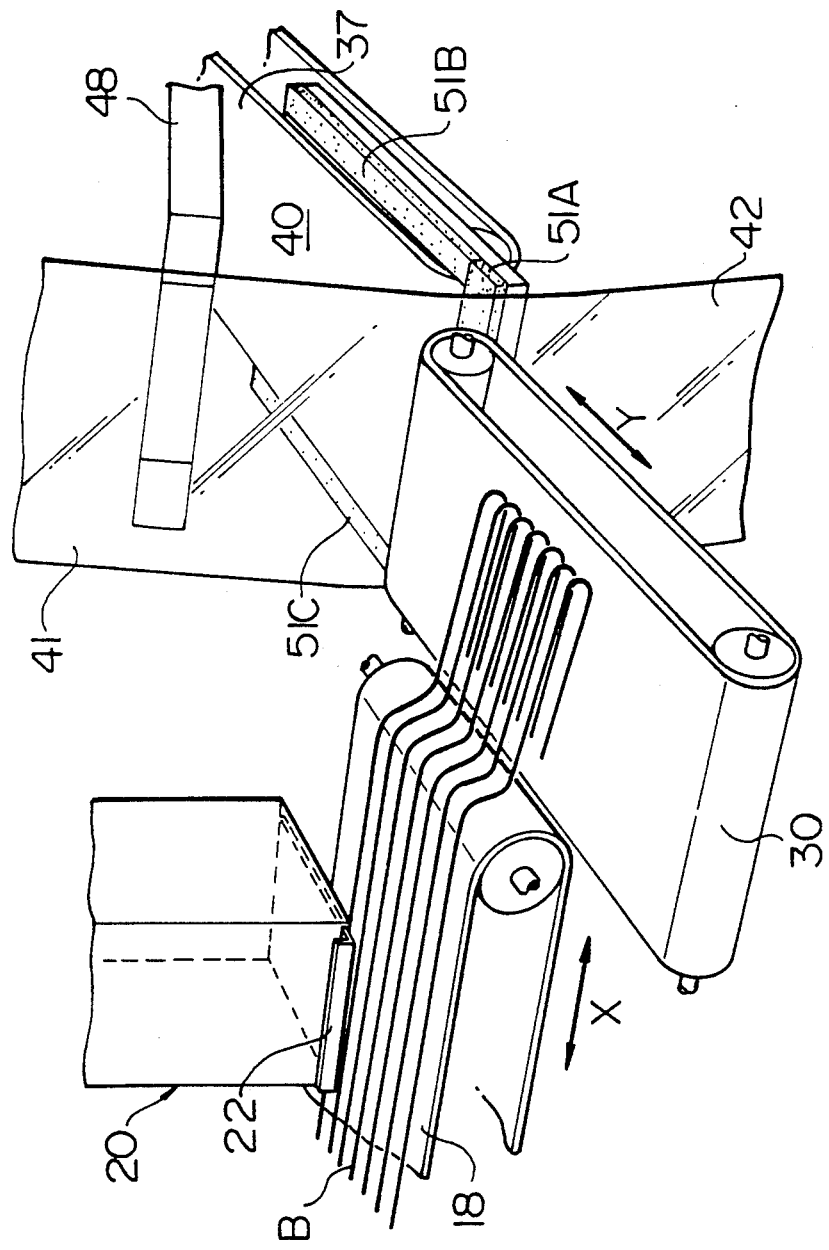
FIG. 5 is a perspective view of essential parts showing mechanisms for the sprinkling of powder on the noodle lines and packing via folding.

FIG. 2 is an overall external view of an automatic vending machine for noodles according to the present invention. Reference numeral 1 designates an apparatus body.

On the upper portion on one front side of the apparatus body 1 is provided an operating panel 2, on which are provided select buttons 3 and for "Large Serving" and "Small Serving", a display portion 5 for an amount inserted, and slots 6A and 6B for a coin or a bill.

In FIG. 2, reference numeral 7 designates an outlet for products provided at the lower portion of the operating panel 2; 8 a return opening for returning change or the like processed by a money processor described later; and 9 a window through which the interior of the apparatus body 1 can be seen.

As shown in FIGS. 1, 3, 4, and 5, on the upper surface of the apparatus body 1 is placed a powder hopper 10 for storing therein grain flour A, and a mixer 11 as a mixing means is installed below the powder hopper 10.

The mixer 11 is provided to stir and mix wheat flour as grain flour supplied in a fixed amount corresponding to one serving from the powder hopper 10 and a solution of salt as kneading water which is supplied through a pump 13, a flow adjusting device 14 and an electromagnetic valve 15 from a water tank 12 to form powdered fish-like noodle materials and discharge said noodle materials between rolling rollers 16 and 16 arranged thereunder.

The noodle materials discharged to and between the rollers 16 and 16 are rolled into a noodle web, which is supplied to and between cutting rolls 17 and 17 where the materials are cut into noodle lines in a parallel aligned state without being overlapped.

Noodle lines B prepared by the noodle-making means composed of the aforesaid hopper 10, mixer 11, rollers 16, 16 and cutting rolls 17, 17 are discharged onto a first conveyor 18, and a powder sprinkling device 20 is provided on the upper portion at a terminal portion in the carrying direction X of the first conveyor 18.

Figure 6:
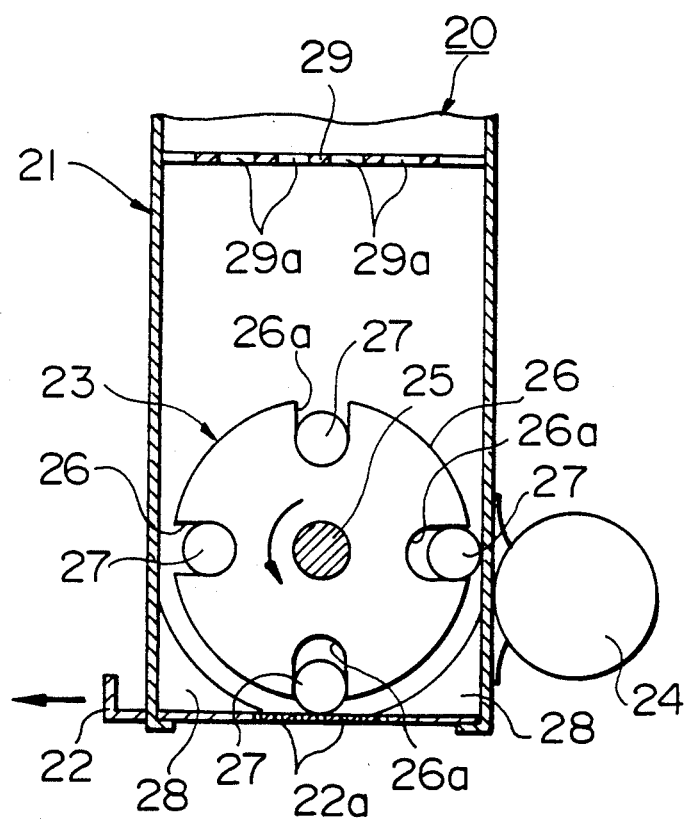
FIG. 6 is a sectional view showing a mechanism for sprinkling powder on the noodle lines.
Figure 7:
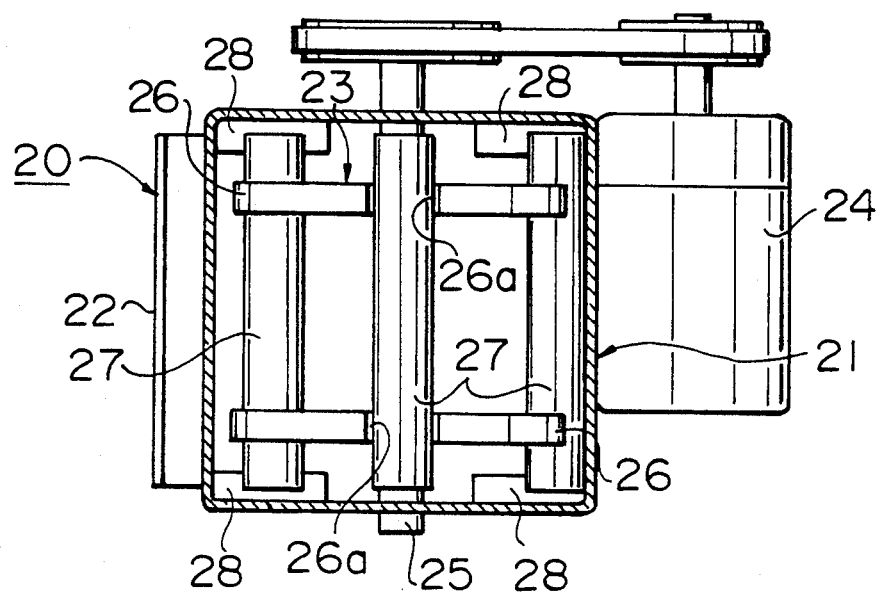
FIG. 7 is a cross-sectional view of the powder sprinkling mechanism.

The powder sprinkling device 20 is composed, as shown in FIGS. 6 and 7, of a hopper portion 21 facing to the upper surface of the apparatus body 1, an opening and closing plate 22 provided slidably closably on a bottom opening of the hopper portion 21 and having a number of powder drop ports 22a, and a powder discharge mechanism 23 provided on the inner bottom of the hopper portion 21 on the upper surface of the opening and closing plate 22.

The powder discharge mechanism 23 is composed of a rotational shaft 25 rotated and driven by a motor 24 with a reduction gear, a pair of rotational disks 26, 26 provided on opposite ends of the rotational shaft 25, a plurality of stirring shafts 27 provided along a circumferential direction of the rotational disks 26, 26 and bridged in a free oscillating state between support shaft grooves 26a, 26a, and guides 28, 28 provided on the bottom side of the hopper portion 21 so as to be positioned at the lower portion in the outer periphery of the rotational disks 26, 26. Powder or flour C, for example, such as corn starch, potato starch, etc. are charged into the hopper portion 21 from the top of the apparatus body 1.

More specifically, in the powder sprinkling device 20, the rotational disks 26, 26 are rotated whereby the stirring shafts 27 are guided so that the latter are rolled on the opening and closing plate 22 constituting the inner bottom surface of the hopper portion 21, the powder C accumulated on the upper surface of the opening and closing plate 22 is compressed by weight of the stirring shafts 27 to discharge the powder C in the hopper portion 21 out of the powder drop ports 22a opened to the opening and closing plate 22, and thereby the powder C is sprinkled on the noodle lines B being carried by and on the first conveyor 18.

Figure 8:
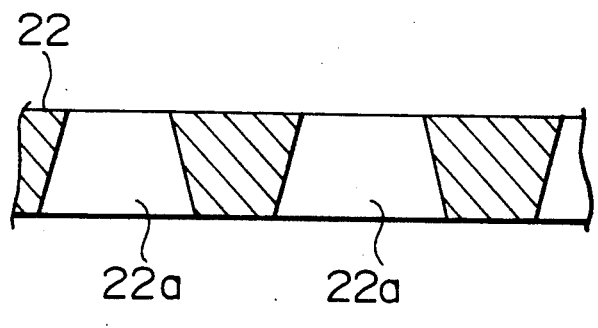
FIG. 8 is a partly enlarged sectional view of an opening and closing plate of the powder sprinkling mechanism.

The powder drop ports 22a opened to the opening and closing plate 22 are each formed with downwardly spread tapered holes, as shown in FIG. 8, whereby even if the powder drop ports 22a are small, they are not clogged and allow smooth discharge of the powder C compressed by the weight of the stirring shafts 27.

When the opening and closing plate 22 is removed, the bottom opening of the hopper portion 21 is opened to discharge the powder C in the hopper portion 21 and allow removal of the stirring shafts 27. Thereby the stirring shafts 27 are easily cleaned, keeping a sanitary condition.

Further, the number of the stirring shafts 27 can be increased or decreased so that the falling amount (sprinkling amount) of the powder C is easily adjusted.

Reference numeral 29 designates a baffle board provided on the upper portion of the powder discharge mechanism 23 within the hopper portion 21 and having a number of holes 29a. The baffle board 29 is provided to reduce the load of the powder C on the inner bottom surface of the hopper portion 21 so as on relieve the load to the powder discharge mechanism 23.

The noodle lines B with the powder C sprinkled thereon in the manner as described above are delivered and deposited onto a second conveyor 30 arranged at the lower portion on the terminal side in the carrying direction of the first conveyor 18.

The second conveyor 30 is arranged so that the carrying direction Y caused by a drive motor 31 is perpendicular to the carrying direction X of the first conveyor 18 and is installed on a frame 32 which is moved slidably in longitudinal and lateral directions.

The frame 32 is reciprocated in a lateral direction (the carrying direction X of the first conveyor 18) at a speed substantially equal to a falling speed of the noodle lines B by a first chain belt 34 driven and controlled by a drive motor 33 when the noodle lines B are fallen from the first conveyor 18 to fold the noodle lines B into a noodle ball having a length substantially equal to the width of said reciprocating motion.

When the noodle lines B are folded into a noodle ball as described above, the frame can be reciprocated in a lateral direction toward the carrying direction Y by means of a second chain belt 36 driven and controlled by a drive motor 35.

The start end of a third conveyor 37 is arranged in a suitably spaced relation at the lower portion on the terminal side of the second conveyor 30, and the rear end of the third conveyor 37 faces the outlet of the apparatus body 1. Reference numeral 38 denotes a drive motor for driving the third conveyor 37 by means of a belt 39.

Reference numeral 40 designates a packing device installed at the upper portion on the start end side of the third conveyor 37.

Figure 9:
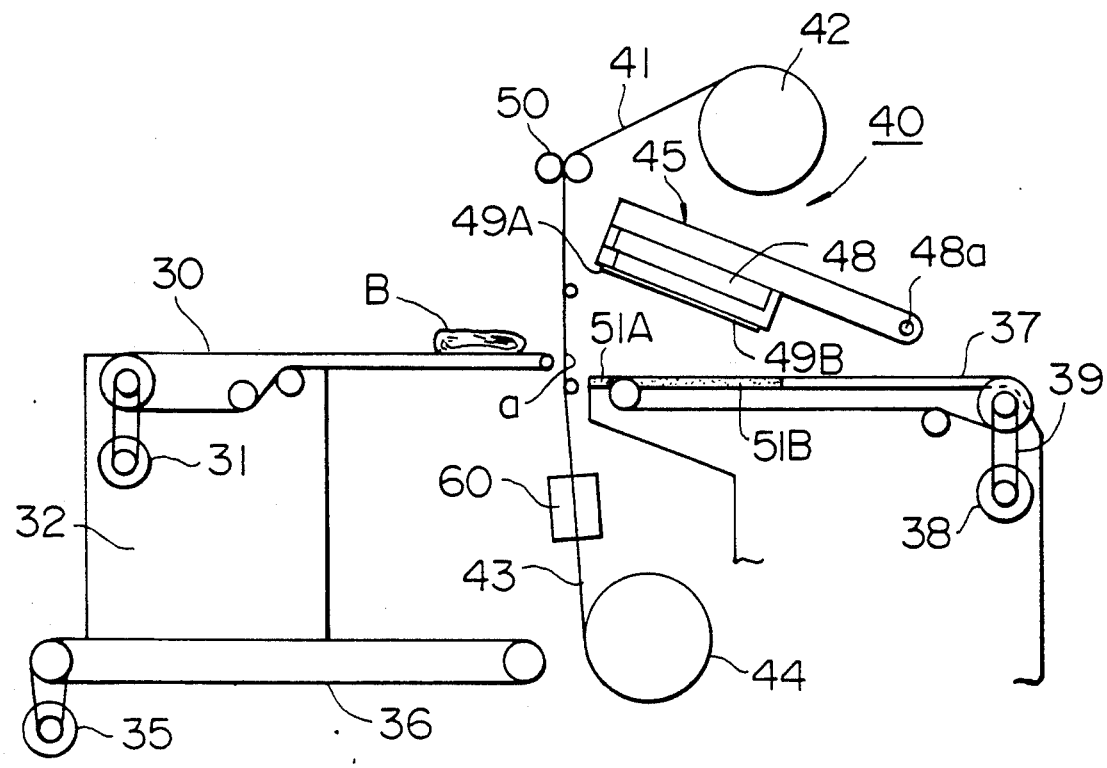
FIG. 9 is a side view schematically showing a packing mechanism for noodle lines.
Figure 10:
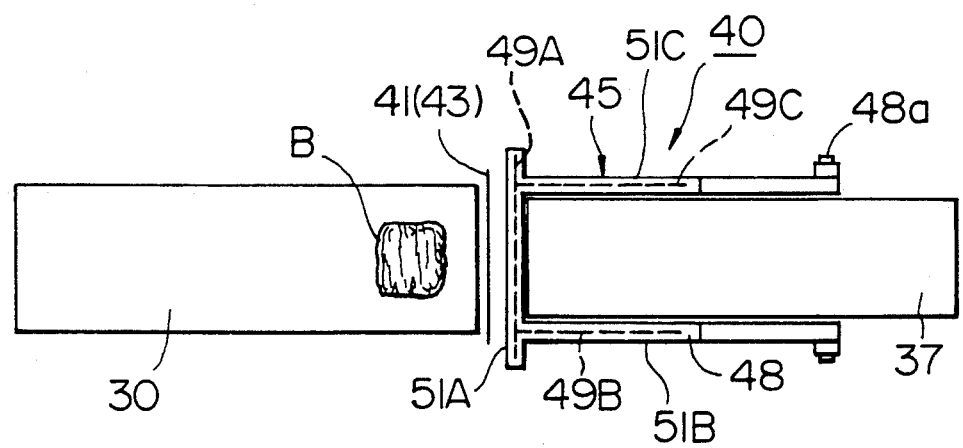
FIG. 10 is a plan view schematically showing a packing mechanism for noodle lines.

The packing device 40 has, as shown in FIGS. 9 and 10, a first supply roll 42 for supplying an upper film 41 and a second supply roll 44 for supplying a lower film 43 from the first supply roll 42. These upper and lower films 41 and 43 which are arranged to be continuous are stretched so as to be positioned between the terminal end of the second conveyor 30 and the start end of the third conveyor 37.

Reference numeral 45 designates a deposition mechanism constituting the packing device 40. The deposition mechanism 45 is composed of a link 47 to be moved up and down by rotation of a drive motor 46, a pressing member 48 movable up and down in response to upward and downward movement of the link and supported by a shaft 48a, and heating wires 49A, 49B and 40C in the form of three nichrome wires arranged so as to from a -shape on the lower surface of the pressing member 48.

Figure 11:
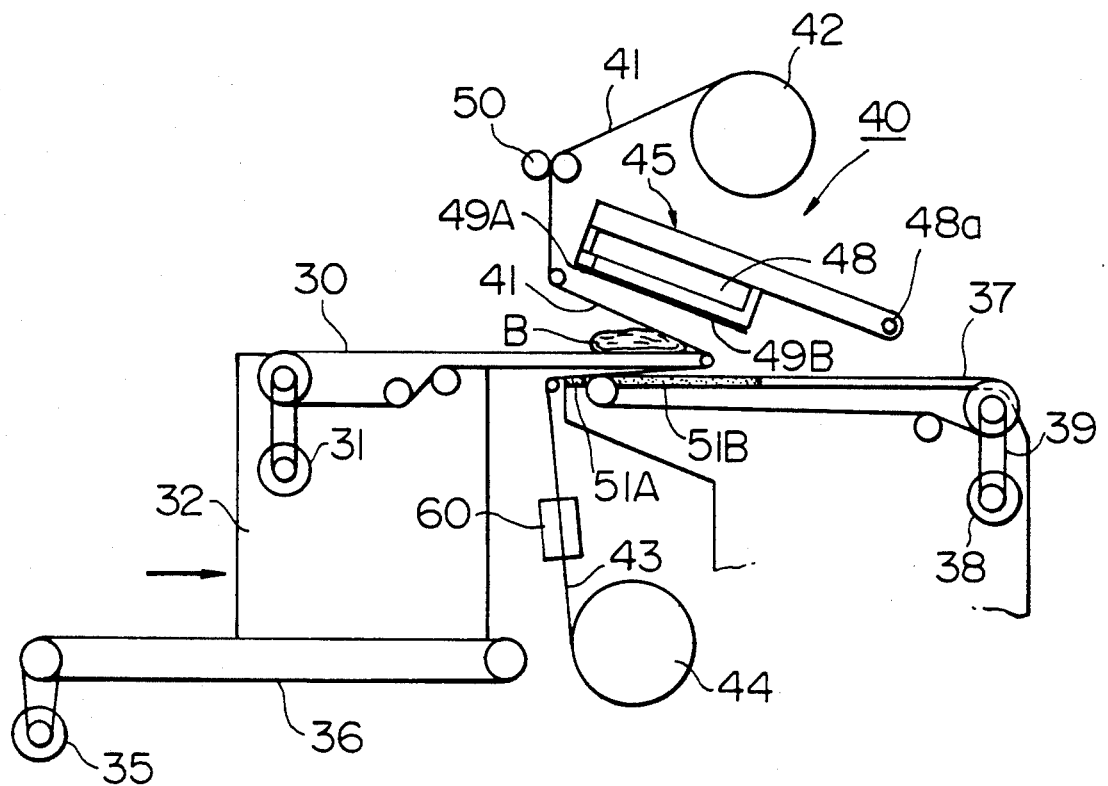
FIGS. 11-18 are explanatory views schematically showing a packing mechanism for noodle lines.
Figure 12:
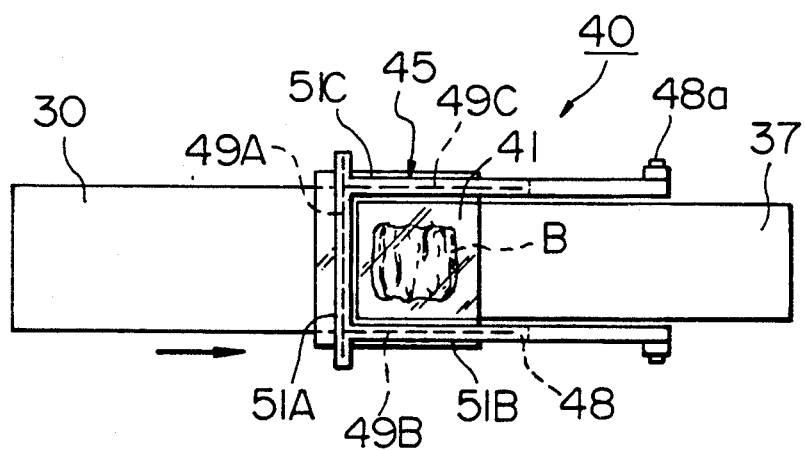

More specifically, as shown in FIG. 11 and 12, when in the state in which the noodle lines B are folded into a noodle ball on the second conveyor 30, the frame 32 is moved forward in the carrying direction Y by the drive of the second chain belt 36 driven and controlled by the drive motor 35, the second conveyor 30 with the noodle lines B placed thereon moves to a position at which the films 41 and 43 to be continuous with each other at the terminal thereof are inserted while being rolled and placed one above the other.

At this time, the upper film 41 wound about the first supply roll 42 is positively delivered by a pinch roller 50 whereas the lower film 43 wound about the second supply roll 44 is passively delivered. If the rotational peripheral speed of the pinch roller 50 is made to be equal to the moving speed of the second conveyor 30, the delivering and using amount of the upper film 41 can be made equal to that of the lower film 43.

Figure 13:
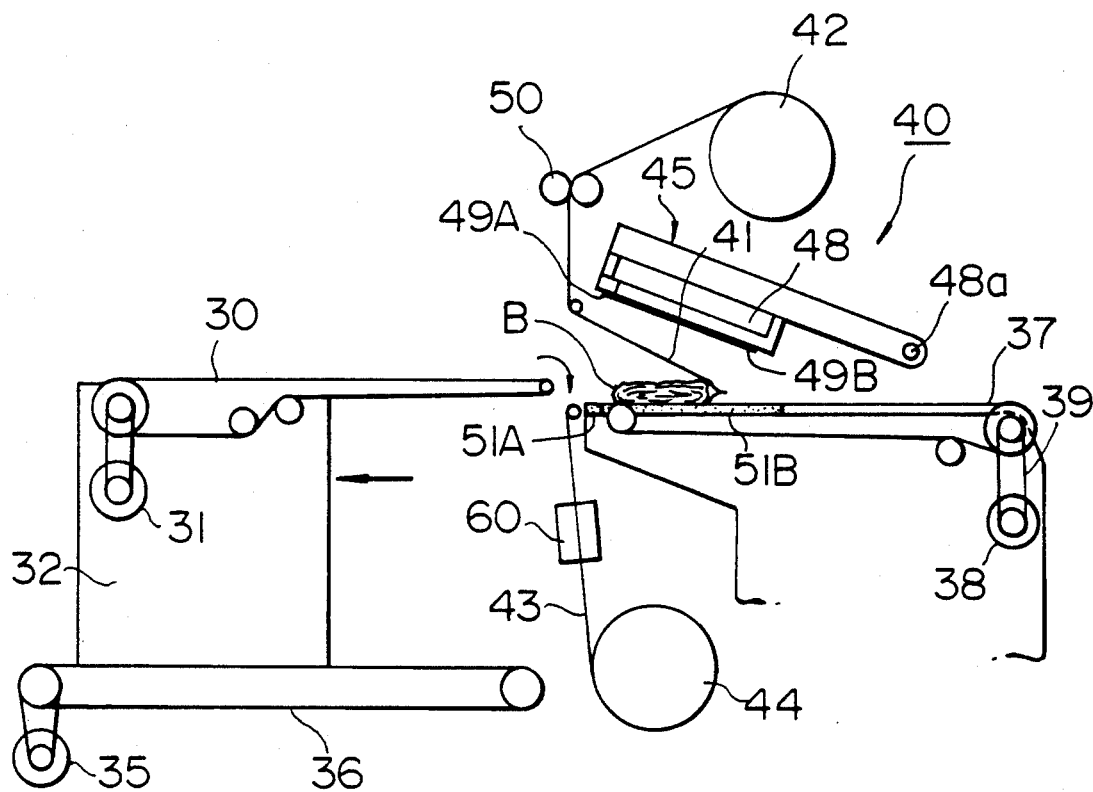
Figure 14:
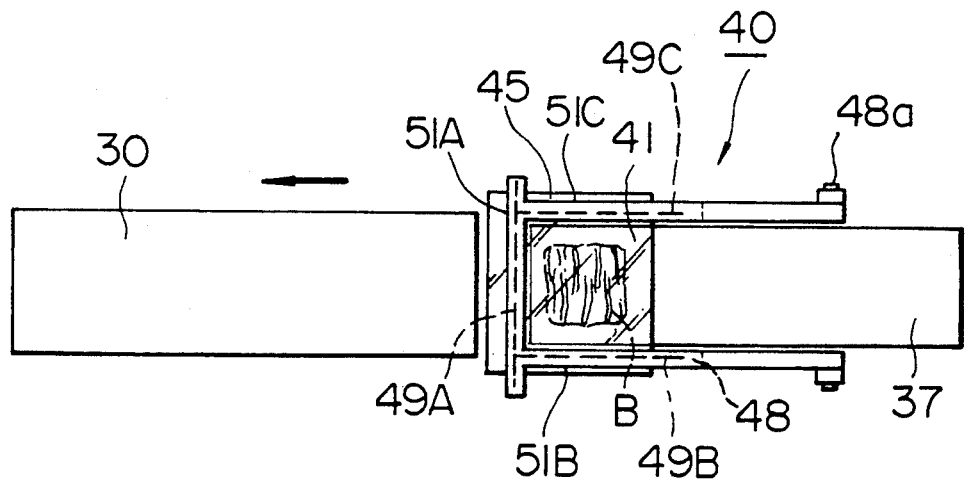

When the second conveyor 30 reaches a predetermined position, the third conveyor 30 moves back to its original standby position as shown in FIG. 9 while causing the noodle lines B to be rotated and driven in the delivering direction and simultaneously, the noodle lines B are placed on the third conveyor 37 as shown in FIGS. 13 and 14.

At this time, the rotational peripheral speed of the belt of the second conveyor 30 is made substantially equal to the backward speed whereby the noodle lines B are placed on the third conveyor 37 while being sandwiched between the films 41 and 43 without relative movement.

Figure 15:
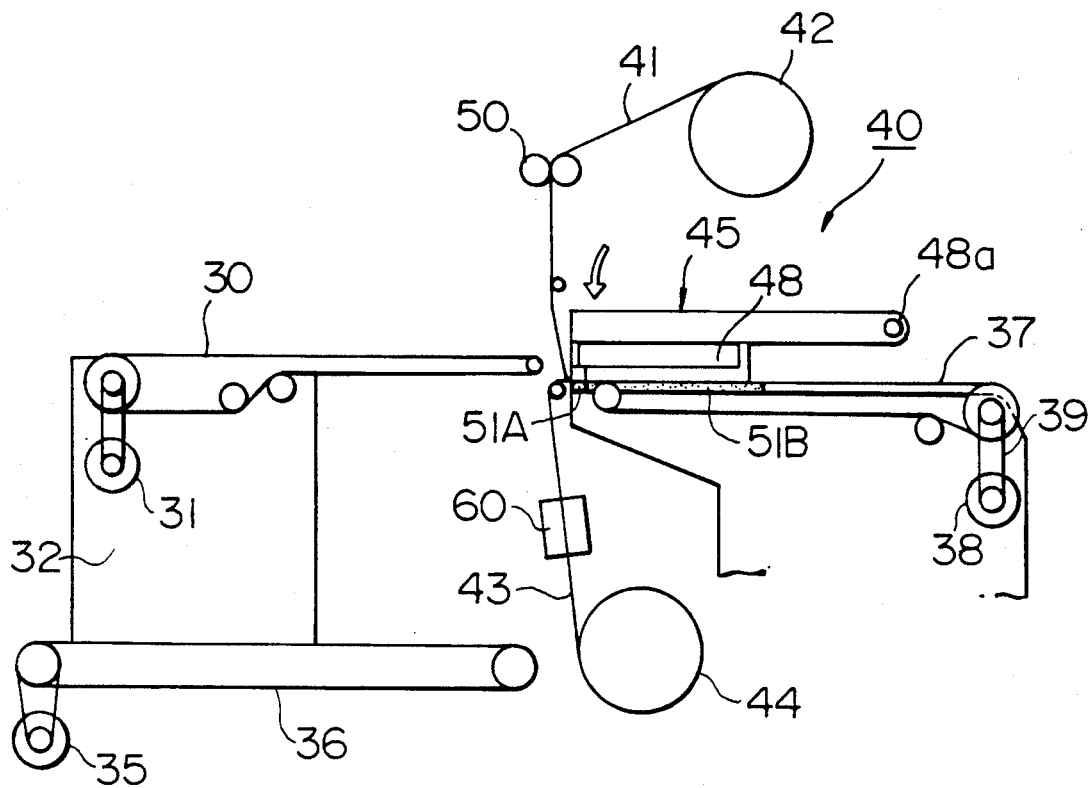
Figure 16:
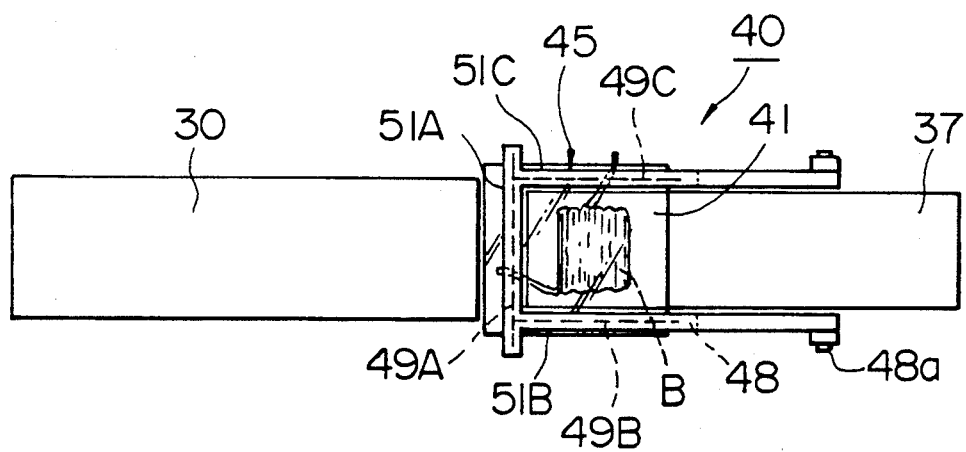

When in this state, the deposition mechanism 45 is actuated by rotation caused by the drive motor 46, the pressing member 48 is moved downward by downward movement of the link 47 as shown in FIGS. 15 and 16, and the noodle lines B are surrounded between the films 41 and 43.

Figure 17:
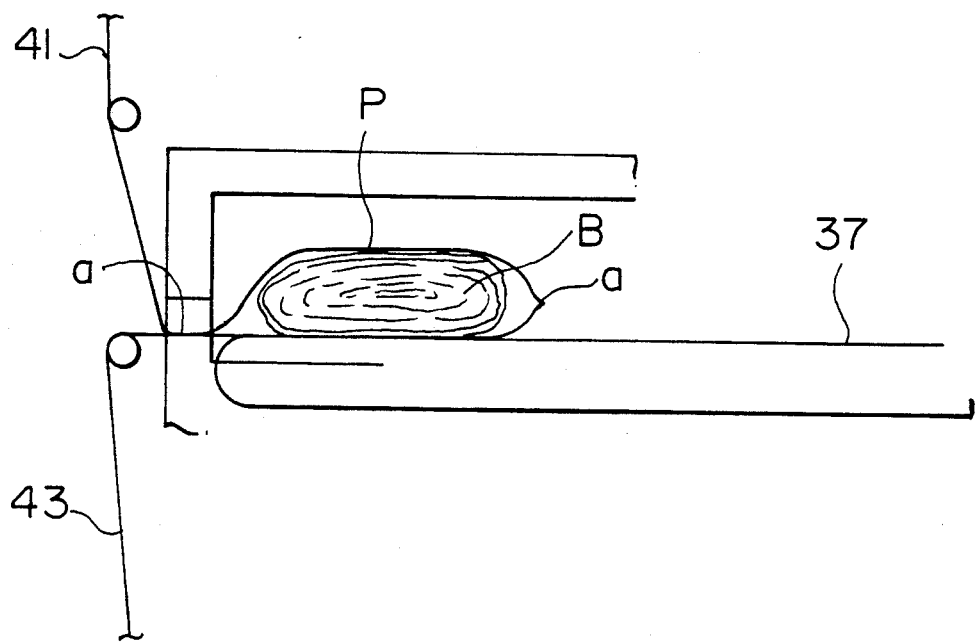
Figure 18:
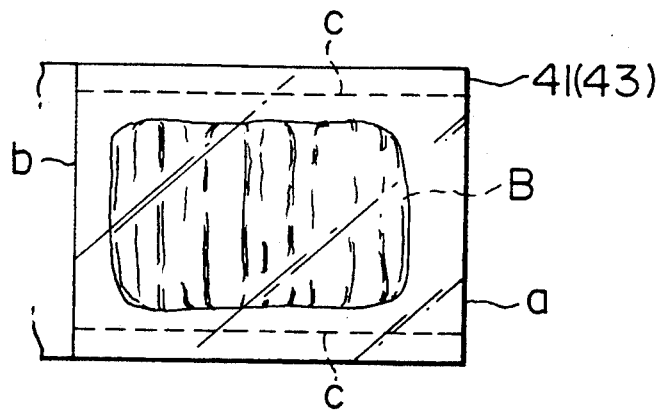
Figure 19:
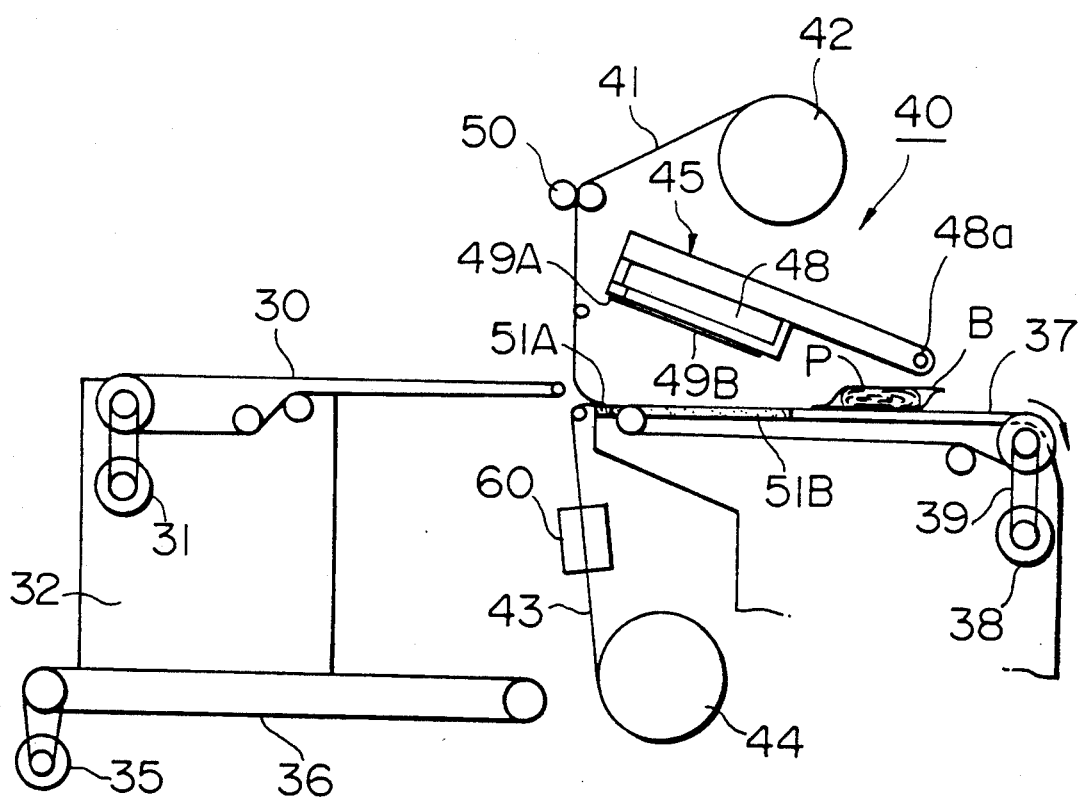
FIG. 19 is an explanatory view showing the carrying state of packed bodies for noodle lines after being packed.

As shown in FIGS. 17 and 18, the heating wires 49A, 49B and 49C arranged in the -shape on the lower surface of the pressing member 48 are energized whereby a central one side portion b as a sealing portion and two side portions c and c as left and right sealing portions of the films 41 and 43 are deposited to seal the noodle lines B.

At this time, the heating wire 49A for depositing the central sealing portion b is made higher in heating value per unit area than that of the heating wires 49B and 49C for depositing other left and right sealing portions c and c, whereby cutting of surplus films 41 and 43 is carried out simultaneously with the deposition.

Reference numerals 51A, 51B and 51C denote cushion members formed of sponge-like elastic material arranged on the sealing portions b, c and c on the side of the third conveyor 37 corresponding to the heating wires 49A, 49B and 49C arranged on the lower surface of the pressing member 48. The cushion member 51a in the central seal portion b as a cutting portion is formed of a material harder than that of the cushion members 51B, 51C in the other left and right sealing portions c,c and the noodle lines B.

That is, as shown in FIG. 16, when the deposition is carried out in the state in which a part of the noodle lines B is forced out from the sealing portion b, c, c of the upper and lower films 41 and 43, the cushion members 51A, 51B and 51C support a part of the noodle lines B particularly forced out of the left and right seal portions c, c so that said part is embedded into the cushion members 51B and 51C. Thereby, at the time of sealing, the contact between the films 41 and 43, except the forced out part of the noodle lines B, is enhanced so that heat of the heating wires 49B and 49C are transmitted easily to the films 41 and 43 to enable deposition. Further, since the cushion member 51A arranged on the central seal portion b corresponding to the cutting portion is formed of a material harder than the noodle lines B, the forced out noodle lines B can be crushed to make cutting of the films easy.

When the noodle lines B are packed by the films 41 and 43, this packed body P is ejected to the outlet 7 of the apparatus body 1 by rotational movement of the third conveyor 37 to enable delivery thereof to a customer.

Reference numeral 60 designates a printing device installed at a halfway point of film delivery of the packing device 40 to print the date of production, selling price, etc. Reference numeral 70 designates a currency processor for processing of change or the like according to an amount charged through slots 6A and 6B. This processor 70 is incorporated to thereby enable unattended sales.

While in the above-described embodiment, the date of production, selling price, etc. have been printed by the printing device 60 installed at a halfway point of film delivery of the packing device 40, it is to be noted that a device can be incorporated in which a label with the date of production, selling price, etc. noted thereon is inserted between the films 41 and 43 when the noodle lines B are packed.

As will be apparent from the foregoing description, according to the present invention, the powder is sprinkled on the noodle lines prepared by the noodle-making means, and the noodle lines with the powder sprinkled are packed into a bag, wich is then discharged to the outlet. Therefore, since noodle-making material to be used comprises grain flour, it can be stored for a long period of time at normal temperature. In addition, fresh raw noodles without addition of preservatives can be automatically sold. Unattended automatic sales can be made.

Further, if food fibers or the like are added to the grain flour used, original noodles of high value added can be made and sold.

Moreover, in the packing means, the noodle lines are moved and rolled and inserted between films and the films around the noodle lines are pressed. The sealing portion between the films around the noodle lines thus pressed is deposited and cut. Therefore, a continuous packing can be made using a roll-like film. A complicated cutter mechanism as in the prior art is not necessary to make construction simple.

Furthermore, the sealing portion between the films around the noodle lines pressed by the pressing means is supported by a cushion member. Therefore, even if a part of the noodle lines is forced out of the sealing portion between the films, the forced out part of the noodle lines is embedded into the cushion member by the pressing force whereby the contact between the films, except the forced out part of the noodle lines, can be enhanced to enable easy deposition between the films.

Further, the aforementioned powder sprinkling means comprises an opening and closing plate provided slidably and closably in a bottom opening of the hopper portion and having a number of powder drop ports. On the upper surface of the opening and closing plate is provided a powder discharge mechanism comprising a rotating and driving rotational shaft, a pair of rotational disks provided on opposite ends of said rotational shaft, a plurality of stirring shafts provided in a circumferential direction on the outer periphery of said rotational disks and bridged in a free oscillating state between support shaft grooves provided on the outer periphery of the disks, and a guide provided on the bottom side of said hopper portion so as to be positioned at the lower portion of the outer periphery of said rotational disks to guide said stirring shafts so that the latter are rolled on the upper surface of the opening and closing plate constituting the inner bottom surface of the hopper portion. Therefore, the rotational disks are rotated whereby the stirring shafts are guided so that the latter are rolled on the upper surface of the opening and closing plate constituting the inner bottom surface of the hopper portion. Powder accumulated on the upper surface of the opening and closing plate are compressed by the weight of the stirring shafts and smoothly discharged out of the powder drop ports of the opening and closing plate.

In addition, when the opening and closing plate is removed, the bottom opening of the hopper portion is opened to enable the discharge of powder within the hopper portion. In addition, the stirring shafts can be easily removed so that the stirring shafts are easily washed and cleaned, which is sanitary.

Furthermore, the number of the stirring shafts can be increased or decreased whereby the falling amount (sprinkling amount) of powder is easily adjusted.

What is claimed is:

1. An automatic vending machine for noodles, comprising:
    noodle-making means for forming grain flour into powdered noodle materials, rolling said materials into a noodle web, and cutting said noodle web into noodle lines to make noodles;
    powder sprinkling means for sprinkling powder on the noodle lines prepared by said noodle-making means;
    packing means for packing the noodle lines which have been sprinkled with the powder by said powder sprinkling means into a bag in the form of a ball of noodles; and discharge means for discharging a bag in which the ball of noodles is packed to an outlet.

2. An automatic vending machine for noodles according to claim 1 wherein said packing means comprises:

noodle insert means for inserting the ball of noodles between films;

press means for pressing films around the noodle ball inserted by said insert means; and deposition means for depositing and cutting a sealing portion between films pressed around the noodle ball by said press means.

3. An automatic vending machine for noodles according to claim 2, wherein the sealing portion of the films is supported by a cushion member.

4. An automatic vending machine for noodles according to claim 1, wherein said powder sprinkling means is composed of a hopper for receiving the powder;

a slidably closeable opening and closing plate provided in a bottom opening of said hopper and having a number of powder drop ports; and a powder discharge mechanism provided on the upper surface of said opening and closing plate;

said powder discharge mechanism comprising a rotatable rotational shaft;

a pair of rotational disks provided on opposite ends of said rotational shaft;

a plurality of stirring shafts provided in a circumferential direction on the outer periphery of said rotational disks and bridged in a free oscillating state between support shaft grooves provided on said outer periphery; and guides provided on a bottom portion of said hopper so as to be positioned at the lower portion of the outer periphery of said rotational disks to guide said stirring shafts so that the latter are rolled on the upper surface of the opening and closing plate.

* * * * *